United States Patent
Prayaga et al.

(10) Patent No.: US 11,924,917 B2
(45) Date of Patent: Mar. 5, 2024

(54) SYSTEMS AND METHODS OF AUTOMATICALLY PRE-PROVISIONING EMBEDDED SUBSCRIBER IDENTIFICATION MODULE (ESIM) PROFILES ON AN INFORMATION HANDLING SYSTEM

(71) Applicant: Dell Products, LP, Round Rock, TX (US)

(72) Inventors: Venkata S. Prayaga, Austin, TX (US); Abeye Teshome, Austin, TX (US); Liam B. Quinn, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/140,988

(22) Filed: Jan. 4, 2021

(65) Prior Publication Data

US 2022/0217525 A1 Jul. 7, 2022

(51) Int. Cl.
| | |
|---|---|
| *H04W 8/20* | (2009.01) |
| *H04W 8/18* | (2009.01) |
| *H04W 8/26* | (2009.01) |
| *H04W 12/06* | (2021.01) |
| *H04W 84/12* | (2009.01) |

(52) U.S. Cl.
CPC ............. *H04W 8/183* (2013.01); *H04W 8/20* (2013.01); *H04W 8/26* (2013.01); *H04W 12/068* (2021.01); *H04W 84/12* (2013.01)

(58) Field of Classification Search
None
See application file for complete search history.

(56) References Cited

U.S. PATENT DOCUMENTS

| | | | |
|---|---|---|---|
| 9,532,219 | B2 | 12/2016 | Schell |
| 10,687,204 | B1 | 6/2020 | Roy |
| 10,716,126 | B2 | 7/2020 | Gulbay |
| 2014/0088731 | A1 | 3/2014 | Von Huack |

(Continued)

FOREIGN PATENT DOCUMENTS

| | | |
|---|---|---|
| EP | 3930361 A1 * | 12/2021 |
| WO | 2017/082966 A1 | 5/2017 |
| WO | 2019/018244 A1 | 1/2019 |

*Primary Examiner* — Gary LaFontant
(74) *Attorney, Agent, or Firm* — Prol Intellectual Property Law, PLLC; H. Kenneth Prol

(57) ABSTRACT

A method of provisioning an embedded subscriber identification module (eSIM) profile on an information handling system may include, with an embedded controller (EC), detecting a powering up process at the information handling system; with the execution of the EC, establishing an out-of-band (OOB) connection with a subscription manager-discovery server (SM-DS) to communicate an electronic identification confirming that the information handling system has an authentic subscription to services provided by a wireless wide area network (WWAN) carrier, the OOB connection being established at a level below an operating system (OS) of the information handling system; receiving a WWAN carrier eSIM profile over the OOB connection including an international mobile equipment identity (IMEI); installing the eSIM carrier profile with an embedded universal integrated circuit card (eUICC); and initiating a subscription confirmation with a WWAN carrier.

20 Claims, 4 Drawing Sheets

(56) References Cited

U.S. PATENT DOCUMENTS

| | | |
|---|---|---|
| 2018/0027480 A1 | 1/2018 | Narasimhan |
| 2018/0069581 A1 | 3/2018 | Narasimhan |
| 2018/0293197 A1 | 10/2018 | Grobelny |
| 2020/0106755 A1 | 4/2020 | Gulbay |
| 2020/0260241 A1 | 8/2020 | Sicard |

* cited by examiner

SYSTEMS AND METHODS OF AUTOMATICALLY PRE-PROVISIONING EMBEDDED SUBSCRIBER IDENTIFICATION MODULE (ESIM) PROFILES ON AN INFORMATION HANDLING SYSTEM

FIELD OF THE DISCLOSURE

The present disclosure generally relates to embedded subscriber identification module (eSIM) provisioning. The present disclosure more specifically relates to eSIM provisioning within an information handling system over a network.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include an antenna system that allows the information handling system to be operatively coupled to a communication network.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
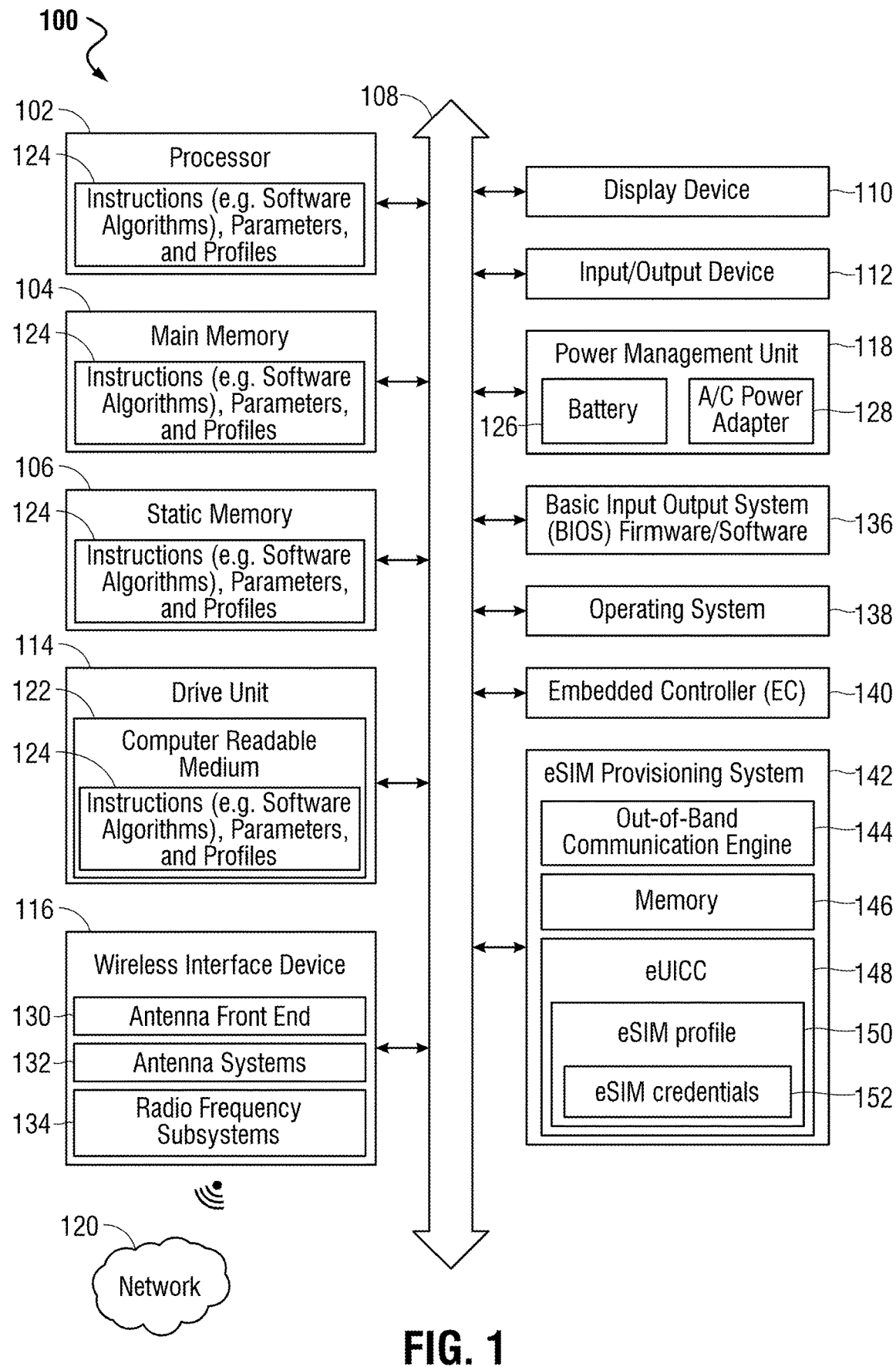
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for a system and method of automatically provisioning an information handling system with an eSIM profile and credentials that allow, for example, a wireless interface device to be operatively connected to a WWAN using an antenna within the information handling system. The method, in an embodiment, may include, with an embedded controller (EC), detecting a powering up process at the information handling system; and, with the execution of the EC, establishing an out-of-band (OOB) connection with a subscription manager-discovery server (SM-DS) to communicate an electronic identification confirming that the information handling system has an authentic subscription to services provided by a WWAN carrier. The method may also include receiving a WWAN carrier eSIM profile over the OOB connection and initiating a subscription confirmation with a WWAN carrier. In these embodiments, the information handling system may be shipped to a user under a built-to-order (BTO) scenario where the user has selected features that the information handling system are to have. Among these selected features may include a specific carrier or carriers to subscribe to in order to operatively couple the information handling system to a wireless wide area network (WWAN). During this BTO process, the user may select and pay for one or more carriers in order to use the carrier's services and network to communicate wirelessly to, for example, the internet. In an embodiment, the eSIM profile and credentials are left blank and instead an ownership identification may be used by the EC to signal to the SM-DS server which carrier or carriers the user has a subscription with. In these embodiments, the SM-DS server may confirm that these subscriptions are valid, and notify the individual carriers to begin to upload any carrier eSIM profiles to the SM-DS which then relays those carrier eSIM profiles to the eSIM provisioning system of the information handling system.

In an embodiment, the established OOB connection with the SM-DS includes the information handling system connecting to a WiFi network using user-provided network security credentials such as a password or other identification information. This may include the EC initiating a OOB communication using a wireless interface device to secure one of a WiFi connection, a Bluetooth connection, a near-field communication (NFC) connection, or other connection with the SM-DS without the operating system being initiated or otherwise loaded. This process may include the EC establishing this OOB connection by loading a driver or drivers associated with the operation of a wireless interface device and associated antenna systems, antenna front ends, and/or radio frequency subsystems. With the EC not initiating the BIOS or the OS of the information handling system, the initiation of the OOB communication with the SM-DS may be OS-independent and may be conducted without input from the user of the information handling system. This may increase the efficiency of downloading the carrier eSIM profile to the eSIM as well as limiting the users' interactions with the carrier eSIM profile and information handling system during an initial boot-up process.

In an embodiment, the information handing system may establish the OOB connection by connecting to the SM-DS via an intermediary companion device such as a mobile phone, a smart phone, an access point, or another information handling system that can relay the ownership identification to the SM-DS and the carrier eSIM profile from the SM-DS to the eSIM provisioning system of the information handling system. Upon receipt of the carrier eSIM profile or profiles, the information handling system may initiate a connection to a wireless network maintained by the WWAN carrier.

In an embodiment, the information handling system may, with the EC, prevent the boot up of a basic input/output system (BIOS) until the initiation with the WWAN carrier is initiated. During this process, in an embodiment, the information handling system may cause a message to appear on a display device of the information handling system to notify a user that the OOB connection has been established and the initiation of the subscription confirmation with the WWAN carrier has been completed. In this embodiment, the EC may control when and what messages are presented to the user using, for example, a timing controller (TCON) of a display panel or some other process and hardware to notify the user of the process of initiating the WWAN connection.

The present specification further describes an information handling system operating an embedded subscriber identification module (eSIM) provisioning system that includes an embedded controller (EC), memory, and network interface device and an eSIM provisioning system including an embedded universal integrated circuit card (eUICC) to prepared to maintain an embedded subscriber identity module (eSIM) profile with an eSIM profile. The information handling system may also include a wireless interface device to, upon powering up of the information handling system and with the EC, establish an out-of-band (OOB) connection with a subscription manager-discovery server (SM-DS) and initiate a subscription confirmation with a WWAN carrier. In an embodiment, the information handling system may establish the OOB connection by connecting to a WiFi network using user-provided network security credentials and/or connecting to the SM-DS via an intermediary companion device. In an embodiment, the information handling system initiates a subscription confirmation with a plurality of WWAN carriers with which a user had requested when requesting a build to order of the information handling system was conducted.

The information handling system may download, via the eSIM provisioning system and across the OOB connection, a WWAN carrier eSIM profile and initiating a connection to a wireless network maintained by the WWAN carrier. In an embodiment, the EC may prevent the boot up of a basic input/output system (BIOS) until the initiation with the WWAN carrier is initiated.

In an embodiment, the information handling may cause a message to appear on a display device of the information handling system to notify a user that the OOB connection has been established and the initiation of the subscription confirmation with the WWAN carrier has been completed. In this embodiment, the EC may present this message by operating a TCON.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. The information handling system 100 can also include one or more buses operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the eSIM provisioning system 142, and drive unit 114 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input/output device 112, such as a cursor control device (e.g., mouse, touchpad, or gesture or touch screen input, and a keyboard. The information handling system 100 can also include a disk drive unit 114.

The network interface device shown as wireless interface device 116 can provide connectivity to a network 128, e.g., a wide area network (WAN), a local area network (LAN), wireless local area network (WLAN), a wireless personal area network (WPAN), a wireless wide area network (WWAN), or other networks. Connectivity may be via wired or wireless connection. Wireless interface device 116 may include one or more radio frequency subsystems 134 with transmitter/receiver circuitry, modem circuitry, one or more radio frequency front end circuits, one or more wireless controller circuits, amplifiers, antenna systems 132 and other radio frequency subsystem circuitry 134 for wireless communications via multiple radio access technologies. These other radio access technologies may include WiFi communications, Bluetooth, or near-field communication (NFC) technologies. The wireless interface device 116 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless interface device 116 may operate two or more wireless links. In an embodiment, low power wireless data communications, for example, may be received via the low power antenna system 132 and antenna front end 130 as described in the present disclosure. The network interface device 120 may operate in accordance with any cellular wireless data communication standards. Network interface device 120, in an embodiment, may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WWAN standards, which may operate in both licensed and unlicensed spectrums. More specifically, the network interface device 120 in an embodiment may transceive within radio frequencies associated with the 5G New Radio (NR) Frequency Range 1 (FR1) or Frequency Range 2 (FR2), or those associated with 4G LTE and other standards predating the 5G communications standards now emerging. NRFR1 may include radio frequencies below 6 GHz. NRFR2 may include radio frequencies above 6 GHz, made available within the now emerging 5G communications standard. Communications within the WLAN or WWAN may be enabled through the use of either an evolved Node B (eNodeB) executing an evolved packet core of an existing LTE system, or a Next Generation Node B (gNodeB) executing the next generation packet core of the 5G cellular standard.

The wireless interface device 116 may also include radio frequency subsystems 134 circuitry used to connect to any combination of macro-cellular wireless connections including 2G, 2.5G, 3G, 4G, 5G or the like from one or more service providers such as a WWAN service provider. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band for WLAN. WLAN, in another example, may also operate at a 2.4 GHz band. WWAN may operate in a number of bands, some of which are proprietary but may include a wireless communication frequency band at approximately 2.5 GHz or 5 GHz bands for example. In additional examples, WWAN carrier licensed bands may operate at frequency bands of approximately 700 MHz, 800 MHz, 1900 MHz, or 1700/2100 MHz as well as the NRFR1, NFRF2, bands, and other known bands.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 120 can communicate voice, video or data over the network 120. Further, the instructions 124 may be transmitted or received over the network 120 via the network interface device or wireless interface device 116.

The information handling system 100 can include a set of instructions 124 that can be executed to cause the computer system to perform any one or more of the methods or computer-based functions disclosed herein. For example, instructions 124 may execute an eSIM provisioning system 142, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 114 and the eSIM provisioning system 142 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 114 and static memory 106 may also contain space for data storage. Further, the instructions 124 may embody one or more of the methods or logic as described herein. For example, instructions relating to the eSIM provisioning system 142 software algorithms, processes, and/or methods may be stored here. In a particular embodiment, the instructions, parameters, and profiles 124 may reside completely, or at least partially, within the main memory 104, the static memory 106, and/or within the disk drive 114 during execution by the processor 102 of information handling system 100. As explained, some or all of the eSIM provisioning system 142 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The eSIM provisioning system 142 may be stored in static memory 106, or the drive unit 114 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may include the eSIM provisioning system 142 that may be operably connected to the bus 108. The eSIM provisioning system 142 computer-readable medium 122 may also contain space for data storage or access to the data storage. The eSIM provisioning system 142 may, according to the present description, perform tasks related to initiating an out-of-band (OOB) communication engine 144 to establish an OOB communication with, in the embodiments herein, a subscription manager-discovery server (SM-DS). The eSIM provisioning system 142 may also include a memory 146 to maintain, for example, WiFi network information such as a password and other certification data to allow the information handling system 100 to communicate with, for example, the subscription manager-discovery server (SM-DS).

The eSIM provisioning system 142 may also include an embedded universal integrated circuit card (eUICC) 148. The eUICC 148 may, in an embodiment, maintain the eSIM profile 150 with its eSIM credentials 152 in order to operatively couple the information handling system 100 to a wireless carrier such as a WWAN carrier network, among others. In an embodiment described herein, the eUICC 148 may be left blank by a manufacturer during a build-to-ship (BTS) process. During this BTS process, a user may order the information handling system 100 that includes various features and hardware to fit the user's needs. One of these features is the selection of a wireless carrier (e.g., WWAN or WLAN carrier) to allow a user to, via the wireless interface device 116, access a wireless connection to a WWAN or WLAN network. In these embodiments, the eUICC 148 is left blank by a manufacturer and instead the carrier eSIM profile is sent to the carriers' server notifying the carrier that the user has subscribed to that carrier's or those carriers' services.

In an embodiment, the eSIM provisioning system 142 may communicate with the main memory 104, the processor 102, the video display 110, the alpha-numeric input/output device 112, and the wireless interface device 116 via bus 108, and several forms of communication may be used, including ACPI, SMBus, a 24 MHZ BFSK-coded transmission channel, or shared memory. Driver software, firmware, controllers and the like may communicate with applications on the information handling system 100.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

During operation, the user may turn on the information handling system 100 for the first time after delivery of the information handling system 100 from the manufacturer. As described herein, the user had engaged the manufacturer to engage in a BTS operation where the user is presented with a variety of options to include in a finally built information handling system 100. These options may include types of processors to be operatively coupled within the information handling system 100, the size and type of memory to install, the type of operating system to include, as well as other software, firmware, and hardware selections. In an embodiment, the user may also select a wireless carrier or carriers to subscribe to in anticipation of using the WWAN or WLAN networks associated with those carriers to, for example, access the Internet, transceive email messages, or otherwise conduct various operations over these types of networks.

The manufacturer, at this point, may leave the eUICC 148 blank by a manufacturer of the eSIM provisioning system 142 blank and not provide any eSIM profiles 150 or eSIM credentials 152 at the eUICC 148. Instead, once the user has selected a specific carrier or carriers, the manufacturer may send the carrier eSIM profile or request for a carrier eSIM profile directly to a server associated with these carriers. In place of the eSIM profile 150 and eSIM credentials 152, the manufacture may include at the eSIM provisioning system 142 or eUICC 148 a device identification. Because the manufacturer has sent the eSIM profile 150 and eSIM credentials 152 to the carriers, the device identification may be used later by the execution of the embedded controller (EC) 140 to automatically provision the eSIM profile 150 and eSIM credentials 152 at the eUICC 148 with little to no interaction from the user.

Again, as the user initiates power to the information handling system 100 the EC 140 may first determine whether the eSIM provisioning system 142 requires an OOB communication to be initiated so as to retrieve from a carrier the eSIM profile 150 and eSIM credentials 152 used to operatively couple the information handling system 100 to the WWAN or WLAN. Where the eSIM provisioning system 142 does not provide an indication that the user had ordered services from a carrier, the process may end with the EC 140 initiating a basic input/output system (BIOS) and booting up the information handling system 100. Where the eSIM provisioning system 142 does provide an indication that the user had ordered services from a carrier, the process may, continue with the initiating an OOB communication using the OOB communication engine 144. This is done prior to the operating system being executed by processor 102 of the information handling system 100. In some embodiments, the BIOS may be executed as well in order for the EC 140 to gain access and control over the wireless interface device 116. In the present specification and in the appended claims, therefore, the OOB may be any communication by the information handling system initiated where the OS and/or BIOS is not initiated by the EC. This allows the communication to be conducted below the OS or BIOS functional level and allows the EC to establish this OOB communication regardless of the OS of the information handling system.

The EC 140 may cause the wireless interface device 116 to initiate a wireless connection with a subscription manager-discovery server (SM-DS). The subscription manager-discovery server (SM-DS) may be used to manage and maintain data related to the carrier or carriers the information handling system 100 is to be associated with as well as help to transmit the eSIM profile 150 and eSIM credentials 152 to the user from the carriers. The EC 140 may, in an embodiment, cause the wireless interface device 116 to initiate a WiFi connection with the Upon being operatively coupled to the subscription manager-discovery server (SM-DS), the EC 140 may direct that the device identification be transmitted to the subscription manager-discovery server (SM-DS) for verification by the subscription manager-discovery server (SM-DS). In an embodiment, the device identification is an encryption of hardware and/or software codes such as serial numbers associated with these hardware components or software installed in the build of an information handling system. The serial numbers, versions, or other codes will thus be unique to the information handling system. Such information may be harvested and known by the information handling system manufacturer and the order of component serial numbers or other codes used may be unique as well adding an additional layer of security. In this embodiment, these serial numbers associated with the hardware and/or software may be encrypted and used as specific device identification being transmitted to the SM-DS for later verification. In the present specification, this device identification may be referred to as a Dell® Device ID (DDID). This DDID may be used by the information handling system and SM-DS as part of a system to authorize the information handling system to receive the carrier eSIM profiles and one or more international mobile subscriber identities (IMSIs). Because the serial numbers associated with the hardware and software within the information handling system is unique to that hardware and software and because these selection and order of serial numbers is unique as well as the selected codes or serial numbers are further encrypted, the possibility of determining a DDID is very low. This increases the security associated with provisioning the carrier eSIM profile and IMSIs at the eSIM of the information handling system.

Verification of the this DDID with a carrier verification request profile previously received for the requesting information handling system will cause the subscription manager-discovery server (SM-DS) to engage with a server or other database associated with the carrier or carriers to send the eSIM profile 150 and eSIM credentials 152 to the eSIM provisioning system 142 of the information handling system 100 via the subscription manager-discovery server (SM-DS). Once the eSIM profile 150 and eSIM credentials 152 are received via the OOB communication, the EC 140 may establish a connection to the carrier's WWAN or WLAN network. The EC 140 may then allow the BIOS to execute the operating system and the process may end. Again, as described herein, this OOB communication may include initiating this communication with the SM-DS using an OOB communication. This OOB communication includes the EC of the information handling system initiating one or more of a WiFi communication, a near-field communication (NFC), or a Bluetooth communication with the SM-DS. In an embodiment, the EC may begin with loading a driver or drivers associated with the operation of a wireless interface device and associated antenna systems, antenna front ends, and/or radio frequency subsystems. With the EC not yet initiating or booting the BIOS or the OS of the information handling system, the initiation of the OOB communication with the SM-DS may be OS-independent and may be conducted without input from the user of the information handling system. In other aspects, BIOS or OS may be initiated and operating, but an EC may conduct OOB communications as well in the background such as for systems used to report system health and the like. This may increase the efficiency of downloading the carrier eSIM profile to the eSIM as well as limiting the users' interactions with the carrier eSIM profile and information handling system during an initial boot-up process.

In an embodiment, the manufacturer may be provided with specific WiFi security information associated with a WiFi network the information handling system is to be operatively coupled to. For example, where a large corporation has purchased a plurality of information handling systems to be used at their physical business location, the purchasing corporation may provide the security information to the manufacturer so that this security information may be stored on a memory device accessible to the EC. During an initial power on of any of these information handling systems, the EC may access this memory, retrieve the WiFi security information, and attempt to initiate a WiFi communication with the corporation's network. This specific embodiment allows an information technology (IT) specialist to pre-provision an information handling system with WiFi security information for a corporation's WiFi (e.g., public or private) at the time of "building" the information handling systems conducted during an ordering process from the manufacturer.

In an embodiment, the user may implement an intermediate device such as a smartphone in order to operatively couple the information handling system 100 to the subscription manager-discovery server (SM-DS). In this embodiment, a WiFi connection, a Bluetooth connection, an NFC connection or other type of connection may be established such that the wireless interface device of the intermediary device is used to communicate with the subscription manager-discovery server (SM-DS) as described herein. In these embodiments, the information handling system 100 may include any number and types of antenna systems 132 to facilitate a WiFi connection, a Bluetooth connection, and an NFC connection. Additionally, the information handling system 100 may include an antenna system 132 that allows for macro-cellular wireless connections including 2G, 2.5G, 3G, 4G, 5G or the like provided by the carriers of the WWAN and WLAN networks upon receipt and set up of received eSIM profiles via OOB connection.

The systems and methods described herein provide for a uniform and OS-independent process of initializing a connection to a carrier subscribed WWAN or WLAN network at the information handling system 100 for eSIM profile via OOB communications. Because the EC 140 executes this initialization, the system and methods described may provide a zero-touch, autonomous solution that provides a streamlined and user-friendly WWAN or WLAN provisioning as part of an out-of-box experience for the user without execution of the OS until use of the received eSIM profile for WWAN connectivity is called upon by the OS. In these examples, the user may not be involved in the WAN provisioning process and may not, in some embodiments, be aware of the process being executed.

Figure 2:
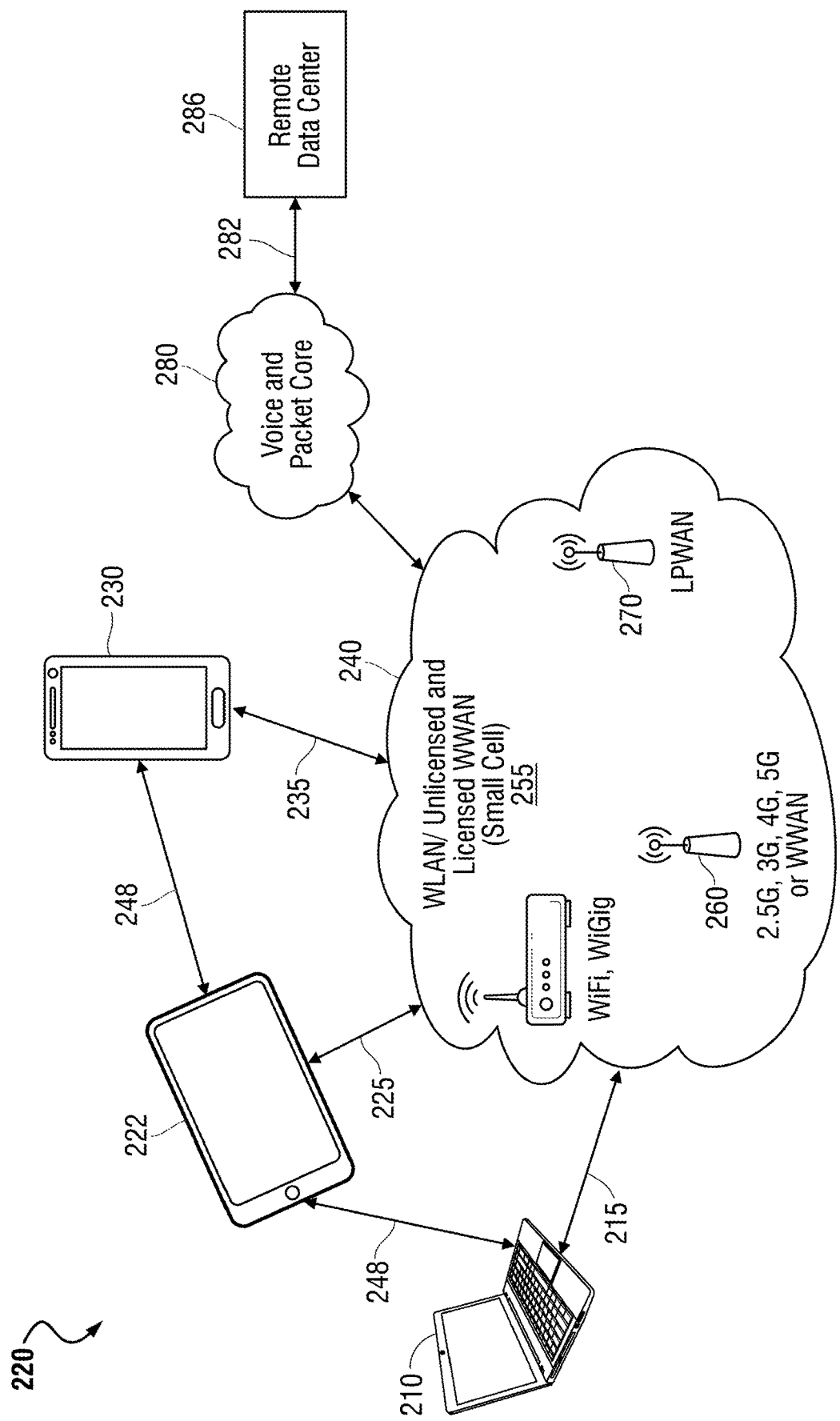
FIG. 2 is a block diagram of a network environment offering several communication protocol options and mobile information handling systems according to an embodiment of the present disclosure.

FIG. 2 is a block diagram of a network environment offering several communication protocol options and mobile information handling systems according to an embodiment of the present disclosure. In a particular embodiment, network 220 includes networked information handling systems 210, 222, and 230 with wireless capabilities, wireless network access points, and multiple wireless connection link options. A variety of additional computing resources of network 220 may include client mobile information handling systems, data processing servers, network storage devices, local and wide area networks, or other resources as needed or desired. As specifically depicted, systems 210, 222, and 230 may be a laptop computer, tablet computer, 360-degree convertible systems, wearable computing devices, a smart phone device, server systems, or other computing systems. These mobile information handling systems 210, 222, and 230, may access any of a plurality of wireless networks 240. In an example embodiment, information handling systems 210, 222, or 230 may be managed information handling systems utilizing the systems and methods disclosed in embodiments herein. Wireless networks 240 may include low power communication technologies such as LPWAN 270, a macro-cellular network 260, or wireless local networks such as 255 including Wi-Fi, WiGig, other WLAN, and small cell WWAN. For example, the wireless networks 240 may be the LPWAN network 270 or other low power communication technologies described in embodiments herein for low-power, always-on wireless communication in some embodiments. In other embodiments, wireless networks may include wireless local area networks (WLANs) or small cell systems 255, a wireless personal area network (WPAN) as between devices such as 210, 220, and 230, or a wireless wide area network (WWAN) such as 260. In an example embodiment, LTE LPWAN networks may operate with a wireless access point option such as an eNodeB (eNB) base station or other LPWAN base station device. In another example embodiment, LTE-LAA WWAN may operate with a small-cell WWAN wireless access point option.

Since WPAN or Wi-Fi Direct Connection and WWAN networks can functionally operate similar to WLANs, they may be considered as wireless local area networks (WLANs) for purposes herein. Components of a WLAN, an LPWAN, or other low power communication technologies may be connected by wireline or Ethernet connections to a wider external network. For example, wireless network access points may be connected to a wireless network controller and an Ethernet switch.

Wireless communications across any of wireless networks 240 may be via standard protocols such as Narrow-band IoT LPWAN, LTE Category Machine LPWAN standards (such as Cat M1), LoRa, Sigfox, other low power communication technologies, IEEE 802.11 Wi-Fi, IEEE 802.11ad WiGig, IEEE 802.15 WPAN, or other emerging 5G small cell WWAN communications such as eNodeB, or similar wireless network protocols. Alternatively, other available wireless links within wireless networks 240 of network 220 may include macro-cellular connections via one or more service providers at the macro-cellular network 260. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like. Wireless networks 240 may include a variety of licensed, unlicensed or shared communication frequency bands as well as a variety of wireless protocol technologies ranging from those operating in macrocells, small cells, picocells, or femtocells. In an embodiment of the present specification, the service providers 260 of the WWAN carriers may operate over licensed bands at frequency bands of approximately 700 MHz, 800 MHz, 1900 MHz, or 1700/2100 MHz for example as well. A network interface device of the networked information handling systems 210, 222, and 230 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards now emerging. NRFR2 may include radio frequencies above 6 GHz, made available within the now emerging 5G communications standard. Communications within NRFR1 may be enabled through the use of either an evolved Node B (eNodeB) executing an evolved packet core of an existing LTE system, or a Next Generation Node B (gNodeB) executing the next generation packet core of the 5G cellular standard.

In some embodiments according to the present disclosure, a networked information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example protocols for use with low power communication technologies may be low-power wireless network access protocols such as LTE Narrowband IoT, LTE Category Machine protocols, LoRa protocols, Sigfox protocols, or other LPWAN protocols enabling device to device communications along with connectivity to wider network resources via ethernet or other wired connections. In the context of the present specification, the networked information handling systems 210, 222, and 230 may include any number of antennas that may operate to first operatively couple the networked information handling system 210, 222, and 230 to a SM-DS via, for example, a WiFi connection, a Bluetooth connection, an NFC connection or other similar wireless connections. As described herein, the WiFi connection, Bluetooth connection, NFC connection, or other similar wireless connections may be initiated as OOB communications. In this embodiment, the OOB communications are initiated by an EC loading a driver or drivers associated with the operation of a wireless interface device and associated antenna systems, antenna front ends, and/or radio frequency subsystems. With the EC not initiating or booting the BIOS or the OS of the information handling system or operating outside of the BIOS or OS, the initiation of the OOB communication with the SM-DS may be OS-independent and may be conducted without input from the user of the information handling system. The networked information handling systems 210, 222, and 230 may further include an antenna that provides for operatively coupling the networked information handling systems 210, 222, and 230 to the service providers 260 operating a WWAN using, for example, 5G communication technologies during OS operations after an eSIM profile is established according to embodiments herein. As described herein, the networked information handling systems 210, 222, and 230 may initially communicate with the SM-DS 00B in order to prove verification of a subscription to the service providers 260 WWAN network and receive a WWAN carrier eSIM profile used to operatively couple the networked information handling systems 210, 222, and 230 to the service provider 260. The carrier may compare unique device identification with a carrier verification request profile previously received at the WWAN carrier relating to the requesting information handling system from the manufacturer. This process is described in more detail herein.

Wireless networks 240 may be connected through to a voice and packet core network 280 that may contain externally accessible computing resources and connect to a remote data center 286 in network 220. The voice and packet core network 280 may contain multiple intermediate web servers or other locations with accessible data (not shown). The voice and packet core network 280 may also connect to other wireless networks similar to those shown within 240 and additional mobile information handling systems such as 210, 222, 230 or similar connected to those additional wireless networks. Connection 282 between the wireless networks 240 and remote data center 286 or connection to other additional wireless networks may be via Ethernet or another similar connection to the world-wide-web, a WAN, a LAN, another WLAN, or WWAN, or other network structure. Such a connection 282 may be made via a WLAN or WWAN access point/Ethernet switch to the external network and be a backhaul connection. The access point may be connected to one or more wireless access points in the WLAN or WWAN before connecting directly to a mobile information handling system such as 210, 222, 230 or may connect directly to one or more information handling systems 210, 222, and 230. Alternatively, information handling systems 210, 222, and 230 may connect to the external network via base stations according to various wireless protocols 255, 260, or 270 within wireless networks 240. The remote data centers or other remote information handling systems may provide central terminals for IT management and security assessment via operation of always-on management or security solution code instructions via cloud agents of such systems in various embodiments.

Remote data centers 286 may include web servers or resources within a cloud environment that operate via the voice and packet core 280 or other internet connectivity. For example, remote data centers can include additional information handling systems, data processing servers, network storage devices, local and wide area networks, or other resources as needed or desired. In the context of the present specification, the remote data center 286 may include a SM-DS used by the information handling systems such as 210, 222, 230 to access and download the WWAN carrier eSIM profile. A remote data center may permit fewer resources to be maintained in other parts of network 220 and may allow the information handling systems such as 210, 222, 230 to operate via an OOB communication in order to download the WWAN carrier eSIM profile as described herein.

During operation, a manufacturer of the information handling systems 210, 222, 230 may access a SM-DS over the plurality of wireless networks 240 in order to provide data related to a subscription to a service provider 260 as well as device identification identifying the information handling systems 210, 222, 230 as service provider subscription devices. After the information handling systems 210, 222, 230 have been built per a purchaser's/user's specifications, the user may initiate the information handling system 210, 222, 230 by actuating a power-on button. In the present specification, an EC of the information handling system 210, 222, 230 may initiate an OOB communication with the SM-DS in order to first verify the identification of the information handling system 210, 222, 230 and then initiate a download of a WWAN carrier eSIM profile to which the user's information handling system 210, 222, 230 has obtained the subscription to. The WWAN carrier eSIM profile may include any eSIM that, once downloaded, allows the information handling system 210, 222, 230 to execute the carrier eSIM profile in order to be operatively coupled to a WWAN associated with the service provider at the macrocellular network 260.

Figure 3:
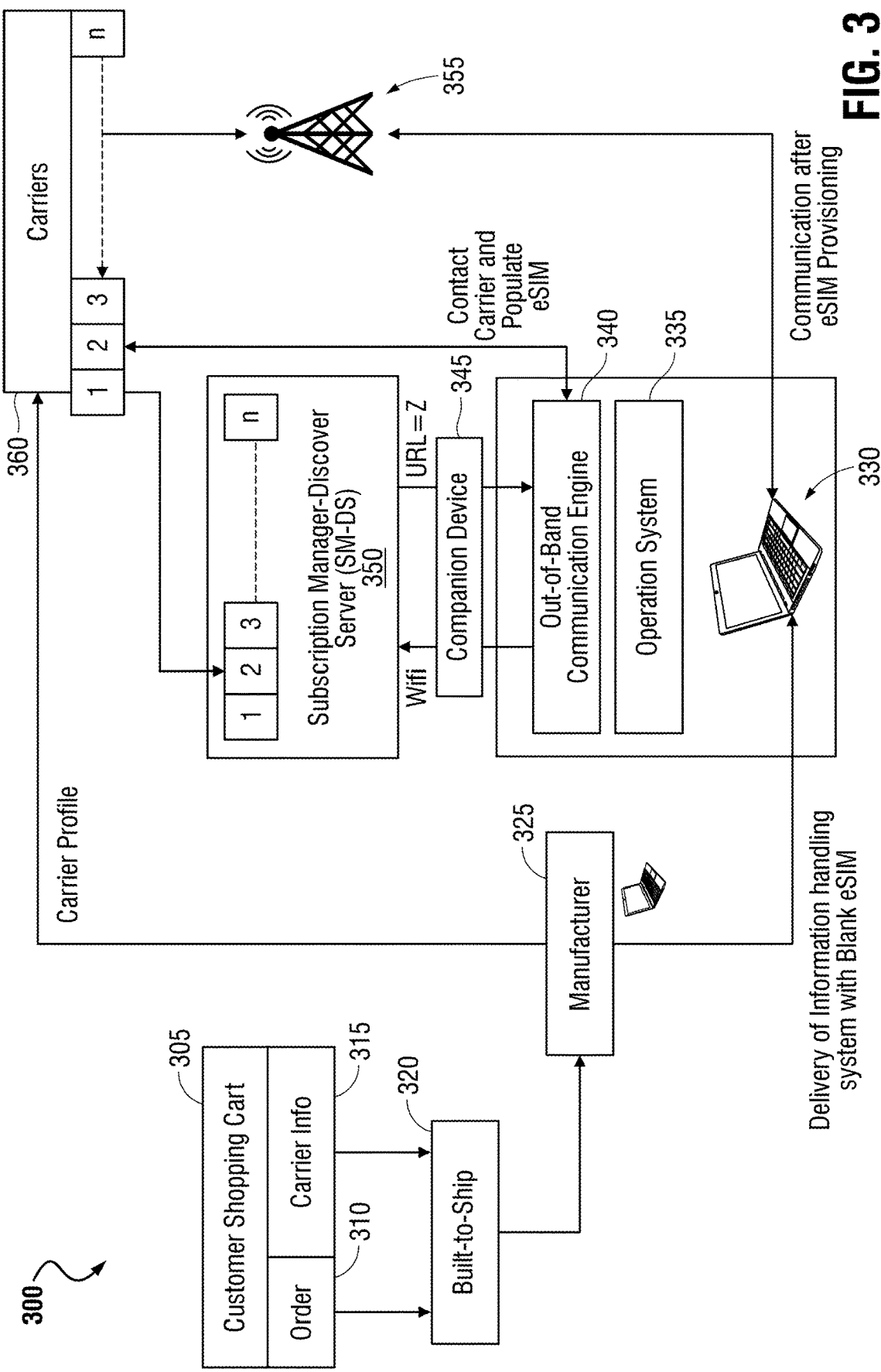
FIG. 3 is a block diagram of a system for out-of-band (OOB) provisioning an embedded subscriber identification module (eSIM) profile on an information handling system according to an embodiment of the present disclosure.

FIG. 3 is a block diagram of a system 300 for provisioning an eSIM profile on an information handling system according to an embodiment of the present disclosure. The system 300 includes a manufacturer 325 of an information handling system 330, and a carrier 360 (e.g., a WWAN service provider 1, 2, 3, or n) that operate together to automatically provide a WWAN carrier eSIM profile to the information handling system 330 over an OOB connection.

The system 300 may include a manufacturer 325 that hosts, for example, an e-commerce website used by a user of the information handling system 330 to build to order and ship a computing device. During access to the e-commerce website, the user any place any order 310 for an information handling system 330 based on selected criteria. For example, the user may build the information handling system 330 by selecting a processor type, a memory size, input devices, a size of a display device, an operating system to be executed by the BIOS of the information handling system 330, software to be pre-installed on the information handling system 330, antenna systems used to operatively couple the information handling system 330 to any of a SM-DS, a carrier 360, and other networked devices.

During this "build" process, the user may also select a specific carrier or carriers 360 to which the user has agreed to pay any subscription fees in order to access the networks (e.g., WWAN) maintained by the carriers 360. In an embodiment, the subscription may include a contract detailing the user's payment obligations. After providing payment for the virtually-built information handling system 330 and the carrier's 360 subscription access, the ordered information handling system 330 may be placed in the customer shopping cart 305 as part of the order 310 to be executed. Along with the order 310 for the information handling system 330 to be built and shipped, the customer shopping cart 305 may also include details related to the carrier's information 315. Specifically, the carrier information 315 may include the name of the carrier 360 or carriers 360 the user has subscribed to, payment details related to the user paying the carrier 360 for the services to be rendered, and any other information relevant to establishing and confirming a contract formed between the user of the information handling system 330 and the carrier or carriers 360.

With this information, the manufacturer 325 may initiate a build-to-ship 320 process. This build-to-ship 320 process includes the physical building of the user's information handling system 330 pursuant to the order 310 placed by the user. As described, the build-to-ship 320 process includes building an information handling system 330 that includes a processor type, a memory size, input devices, a size of a display device, an operating system to be executed by the BIOS of the information handling system 330, software to be pre-installed on the information handling system 330, antenna systems used to operatively couple the information handling system 330 to any of a SM-DS, a carrier 360, and other networked devices, among other features as detailed in the order 310. Along with the build, the manufacturer 325 may include the carrier information 315 and specific identification of the information handling system 330 on a memory device of the information handling system 330.

The carrier information 315 and identification of the information handling system 330 with a unique, device identification code or value, such as an encrypted DDID, may be provided to a carrier 360. The manufacturer 325, who may harvest the information of component serial numbers or other codes used in a unique device identification in some embodiments and which receives the carrier information 315 may provide a carrier verification request profile to the carrier 360 for later verification that the identified information handling system 330 requesting to download a carrier eSIM profile to access the carrier WWAN via an 00B connection is properly identified before the carrier eSIM profile is provided.

This carrier information 315 and identification of the information handling system 330 are used later to securely identify the information handling system 330 as validly requesting access to download any carrier 360 eSIM profile to an eSIM of the information handling system 330. In the present embodiment, this identification of the information handling system may be the DDID described herein. Again, this DDID may be used by the information handling system and SM-DS as part of a system to authorize the information handling system to receive the carrier eSIM profiles and one or more international mobile subscriber identities (IMSIs). In this embodiment, the DDID is an encryption of hardware and/or software codes such as serial numbers associated with that hardware or software. These serial numbers associated with the hardware and/or software installed may be harvested by a device manufacturer in a particular selection or order encrypted and used as specific device identification. Such a specific device identification may be used and transmitted to the SM-DS for later verification of a specific information handling system. Because the serial numbers associated with the hardware and software within the information handling system is unique to that hardware and software and because these serial numbers are further encrypted, the possibility of determining a DDID is very low. This increases the security associated with provisioning the carrier eSIM profile and IMSIs at the eSIM of the information handling system.

After physically building the user's information handling system 330 according the specifications laid out in the order 310, the manufacturer 325 may ship the information handling system 330 to the user. Concurrently, the manufacturer 325 may also provide a device ID (e.g., DDID) to a carrier and/or a subscription manager-discovery server (SM-DS) 350 in order to associate a carrier eSIM profile to a specific information handling system 330. In an embodiment, the carrier eSIM profile may be associated with the electronic identification that matches an identification of the information handling system 330 being shipped to the user (e.g., the DDID described herein). In an embodiment, the carrier eSIM profile may include an international mobile equipment identity (IMEI) that may be used to identify the information handling system 330 and, specifically the eSIM within the information handling system 330. This information may be used later to operatively couple the information handling system 330 to the carrier 360 and its WWAN or other wireless network 355.

Once received, the user may unbox the information handling system 330 and initiate a start-up process by activating, for example, a power button. Once activated, the information handling system 330 may initiate a startup-sequence that includes the embedded controller establishing an out-of-band (OOB) communication (e.g., WiFi communication) with the SM-DS 350. In order to accomplish this, the EC may access and load certain drivers associated with a wireless interface device (e.g., wireless interface device 116, FIG. 1) and execute computer code used to establish this communication with the SM-DS 350 using any type of antenna within the information handling system 330 in an embodiment. This occurs such that before a regular boot-up process proceeds and the BIOS and OS 335 boots up, an OOB communication is established via the EC establishing a wireless protocol stack, such as a WiFi stack, a Bluetooth stack, an NFC stack or other, via antenna controllers to establish communications outside of that utilized for full application data communications by an OS. Such OOB communications may be established, such as in information handling systems, behind the scenes of an OS operation and function. For example, some such OOB communications may be established for reporting of machine health status, operations, or the like and may communicate some such data to an enterprise IT manager even when the OS has entered a low power mode. By booting up the OS 335 and, possibly, the BIOS, the OOB communication has already initiated to download the carrier eSIM profile as subscribed from the SM-DS or a secure URL provided from the carrier SM-DS. This avoids having the user prompt the information handling system to establish communication with the SM-DS themselves. The carrier eSIM profile with IMSI and other WWAN connection credentials may be established in the eSIM system and ready for wireless communications when the BIOS and OS are fully booted to conduct application data wireless communications. In the example embodiment of a sequential boot up, the EC in the present specification automatically initiates the OOB communication and automatically downloads the carrier eSIM profile as described herein outside of operation of the OS.

Again, as described herein, this OOB communication may include initiating this communication with the SM-DS using an OOB communication executed by an OOB communication engine 340. In an embodiment, the OOB communication engine 340 may be operated by the EC of the information handling system 330 after powering on of the information handling system 330 and before the BIOS and/or OS 335 is initiated by the EC described herein. The OOB communication engine 340 establishes wireless communication drivers with one or more wireless options via antenna controllers and which may include Wi-Fi, or Bluetooth or NFC communications with an intermediary companion device which may in turn establish wireless communications with a WWAN an SM-DS.

The OOB communication described in embodiments herein is started when the EC of the information handling system 330 initiates one or more of a WiFi communication, a NFC communication, or a Bluetooth communication with the SM-DS. In an embodiment, the EC may begin with loading a driver or drivers associated with the operation of a wireless interface device and associated antenna systems, antenna front ends, and/or radio frequency subsystems. With the EC not initiating or booting the BIOS or the OS of the information handling system as of yet, the initiation of the OOB communication with the SM-DS is OS-independent and may be conducted without input from the user of the information handling system. This may increase the efficiency of downloading the carrier eSIM profile to the eSIM as well as limiting the users' interactions with the carrier eSIM profile and information handling system during an initial boot-up process.

This OOB communication is done seamlessly and the user may not be made aware of the communication. However, in some embodiments, the information handling system 330 may require WiFi passwords or other network credentials in order to access the SM-DS 350 over the WiFi connection. In this embodiment, the user may be promoted to provide these network credentials via a display device of the information handling system 330. In this embodiment, the EC may control a timing controller (TCON) of the display device to present instructions to the user to provide these network credentials. Once these network credentials are received, the EC may establish the OOB communication with the SM-DS 350. Where credentials are not provided, the EC may cause the BIOS to load the operating system and further cause a notice to be presented to the user that the carrier eSIM profile could not be downloaded to the eSIM and communication with the carrier 360 could not be established. In other aspects, the credentials may be pre-loaded in the manufactured information handling system 330 to enable automatic access to the SM-DS 350 to obtain a WWAN eSIM for regular WWAN access for a carrier during OS 335 operation.

In an embodiment, the information handling system 330 may establish the OOB connection by, with the OOB communication engine 340, connecting to a WiFi network using user-provided network security credentials and/or connecting to the SM-DS via an intermediary companion device. In this embodiment, the companion device 345 may be communicatively coupled to a network that has access to the SM-DS 350. In this embodiment, the EC may initiate the OOB with the companion device 345 so that the companion device may act as an intermediary to the information handling system 330 and the SM-DS 350. Again, in an embodiment, any security credentials used by the information handling system 330 to communicate with the companion device 345 may be pre-provisioned by an IT specialist during the "building" the information handling systems conducted during an ordering process from the manufacturer.

The credentials for identifying the information handling system to a carrier WWAN, including a unique device identification, may be provided via the OOB communication to the SM-DS 350 and verified there a being the identified information handling system associated with a subscription for access to a carrier's WWAN system. Then, in an embodiment, the SM-DS 350 may provide a carrier eSIM profile or a secure URL location from which a carrier eSIM profile may be downloaded via OOB to the information handling system by the EC.

Where the SM-DS 350 has been accessed by the EC of the information handling system 330, the EC may provide the IMEI and other device identification data provided on the memory of the information handling system 330 to the SM-DS 350. The SM-DS 350 may communicate with the carriers 360 (e.g., a server of the carrier 360) in order to confirm this IMEI and/or DDID with the carriers 360. Once confirmation is complete, a WWAN carrier eSIM profile may be downloaded by the SM-DS 350 to the eSIM of the information handling system 330. In an embodiment, the SM-DS 350 may provide to the EC a secure uniform resource locator (URL) that the information handling system 330 can access in order to directly established a connection with the carrier 360 and download the carrier eSIM profile to the eSIM. The carrier eSIM profile that is downloaded may include WWAN access credentials to the carrier WWAN including an assigned IMSI and other carrier credentials. In either embodiment, the eSIM may store the carrier eSIM profile and initiate a communication with the carrier over, for example, a WWAN 355 using an LTE enabled antenna system on the information handling system 330 upon booting of the OS 335 for use with applications on the information handling system 330. In this way, the user's information handling system 330 is operatively coupled to the carrier's network (e.g., mobile broadband network) using the eSIM having an IMSI indicating an active subscription to a carrier's network.

Again, this process may be completed with little to no interaction from the user such that it may appear to the user to be a seamless boot-up of the information handling system 330. Additionally, because the EC controls the operation of the communication and downloading of the carrier eSIM profile via the OOB communication engine 340, the process is OS independent thereby initializing a connection to a carrier 360 subscribed WWAN 355 or WLAN network at the information handling system 330 for downloading of the carrier eSIM profile without operation of the OS 335. Unlike other eSIM initialization processes, the systems 300 and method described herein do not require a carrier quick response (QR) code to be used to manually download the carrier eSIM profile or any other operating system-specific processes being initiated.

Figure 4:
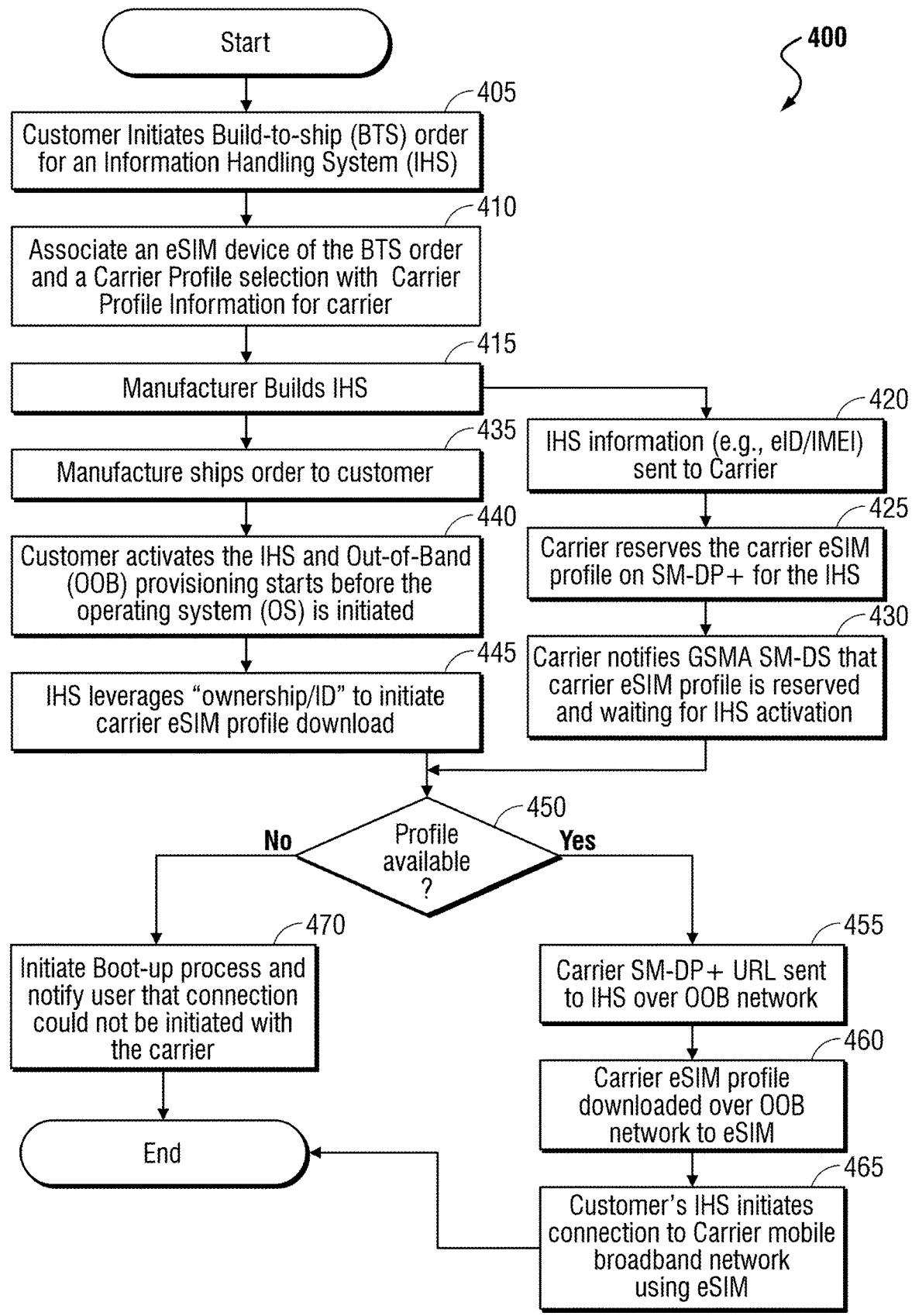
FIG. 4 is a flow diagram of describing a method of OOB provisioning an eSIM profile on an information handling system according to an embodiment of the present disclosure.

FIG. 4 is a flow diagram of describing a method 400 of provisioning an eSIM profile on an information handling system according to an embodiment of the present disclosure. The method 400 may begin at block 405 with a customer (e.g., user of an information handling system) initiating a build-to-ship (BTS) order for an information handling system. As described herein, the BTS process may include a user selecting any specific hardware, firmware, and software to be included with the information handling system the customer intends to purchase. In an embodiment, where an eSIM is selected as a hardware/firmware device by the user during the BTS process, the manufacturer may further require that the user select or may cause an automatic selection of an antenna used to communicate with a carrier based WWAN network or plural carrier based wireless networks. For example, subscription to one or more carrier wireless network services may be selected during the build. This antenna system may be one of many different types of antennas, for example, so as to provide both sub-6 GHz communications and communications above 6-GHz under carrier-band 5G protocol wireless carriers.

At block 410, the method 400 may associate a selection of an eSIM device with the BTS order as well as a carrier selection made during the build. In an embodiment, this may involve a request for a carrier eSIM profile information for a specific carrier or carriers. Again, the carrier verification request profile may match with an IMEI and/or DDID as described herein and is sent to a carrier to be used later when the user has received the information handling system. This carrier verification request profile may be drawn from the information handling system build, including a unique device identification specific to the built information handling system and this may be stored on a memory device or shared with the carrier.

At block 415, the manufacturer of the information handling system may begin to build the information handling system. As described herein, the manufacturer may build the information handling system based on an order form created by the user during the BTS process. Again, the manufacturer may build the information handling system to include those hardware, firmware, and software features and instances requested by the user. The hardware components and firmware or software components included in the build may have codes or serial numbers harvested by the manufacturer and used to create a unique, encrypted device identification unique to the information handling system. Such a unique device identification, e.g. eID, may be associated with the selected carrier and included in a carrier verification request profile sent to the carrier at block 420. Further, the unique device identification may be utilized by the built information handling system in identification.

In an embodiment, the unique device identification is an encryption of hardware and/or software codes such as serial numbers associated with that hardware or software. In this embodiment, these serial numbers associated with the hardware and/or software of the information handling system may be encrypted and used as specific device identification being transmitted to the SM-DS for this later verification. In the present specification, this device identification may be referred to as a Dell® Device ID (DDID). This DDID may be used by the information handling system and, later, the SM-DS as part of a system to authorize the information handling system to receive the carrier eSIM profiles and one or more international mobile subscriber identities (IMSIs) and other carrier eSIM profile data. Because the serial numbers associated with the hardware and software within the information handling system are unique to that hardware and software, because the selection of components used and the order used to form the DDID, and because these serial numbers are further encrypted, the possibility of determining and spoofing a DDID is very low. This increases the security associated with provisioning the carrier eSIM profile and IMSIs at the eSIM of the information handling system.

Thus, at block 420 the manufacturer sends the information handling system unique identification code and requested wireless subscription information in the carrier verification request profile to the carrier providing wireless services. This information of the carrier verification request profile may include any electronic identification (e.g., DDID) or IMEI that allows the carrier to confirm that an information handling system is to be associated with a specific eSIM and a particular contract entered into by the user. The carrier may maintain this carrier verification request profile on, for example, a SM-DS where the information handling system can later access using an OOB communication as described herein. As described herein, the SM-DS and/or carrier may match carrier verification request profile with the information handling system based on the electronic identification (e.g., DDID) provided to the SM-DS and/or carrier by the manufacturer of the information handling system during the build process of the information handling system. As described below, upon identification of this DDID with the carrier verification request profile, for example, the wireless carrier may provide carrier eSIM profiles to the information handling system, such as via an secure URL location that may be downloaded via OOB communication.

The method 400 may also include the carrier reserving a carrier eSIM profile on, for example a subscription manager data preparation platform (SM-DP+) or providing a link to a secure URL where the carrier eSIM profile may be downloaded, for the specific information handling system built by the manufacturer at block 425. The carrier may maintain this data until notified that the carrier eSIM profile for the information handling system is to be downloaded by the information handling system as described. Again, the DDID or other information handling system identification (e.g., an IMEI) of the carrier verification request profile may allow for the wireless carrier to identify the information handling system as being a subscriber to the services provided by the wireless carrier as provided by the manufacturer from the build. In an embodiment the data of the carrier eSIM profile may include IMSI and other authentication data for access to the carrier wireless network such as an LTE network, a 5G network, or the like.

The method 400 may also include, at block 430, with the carrier notifying a GSM Association SM-DS that the carrier eSIM profile is reserved and waiting for the activation of the information handling system. This may include providing a secure URL location for the SM-DS to provide to the information handling system OOB in order to download the carrier eSIM profile. This reservation process may prevent any other information handling system from accidentally downloading the same carrier eSIM profile as another information handling system. Matching of the DDID, IMEI, or other identification data with the carrier verification request profile may be conducted before the carrier eSIM profile is downloaded to the information handling system as indicated at block 445.

Concurrently or sequentially to the manufacturer sending the information handling system carrier verification request profile to the carrier providing services at block 420, the manufacturer, at block 435, may ship the ordered information handling system to the user as requested. The user may have, during the BTS process, provided an address where the information handling system may be shipped. It is understood that in some embodiments, the number of ordered information handling systems may exceed one. In this embodiment, an enterprise such as a law firm, a research group, a school, among others may order batch amount of information handling systems which each may include a subscription to one or more carriers' services as described herein. The BTS process and the method 400 described herein allows for both a better ordering experience as well as a better atomization of downloading carrier eSIM profiles to the eSIMs of these information handling systems. Where the efficiencies of the presently described method are described in connection with a single purchase of a single information handling system, the benefits are equally applicable to batch of purchases.

The method 400 may continue at block 440 with the user (e.g., customer of the manufacturer) activating the information handling system and an out-of-band (OOB) provisioning. In an embodiment, the EC starts tis OOB provisioning before the operating system (OS) of the information handling system is initiated by the BIOS. By doing this, the EC may operate at a lower stack of the information handling system in order to initiate this OOB provisioning process as described herein. Further, because the operating system is not called by the BIOS, this process may be conducted on an OS-independent basis. As described herein, the EC establishes this OOB connection with an OOB communication engine loading a driver or drivers associated with the operation of a wireless interface device and associated antenna systems, antenna front ends, and/or radio frequency subsystems. In some embodiments, any credentials associated with a WiFi network or other OOB wireless connection may be pre-loaded in the manufactured information handling system to enable automatic access to the SM-DS to obtain a WWAN eSIM for regular WWAN access for a carrier during OS operation. This pre-loading of the WiFi network credentials may be done by an IT specialist ordering the information handling system on behalf of the user in, for example, a corporation organization.

In another embodiment, the user may be promoted to provide any network credentials via a display device of the information handling system. In this embodiment, the EC may control a timing controller (TCON) of the display device to present instructions to the user to provide these network credentials. Once these network credentials are received, the EC may establish the OOB communication with the SM-DS.

As described herein, the OOB may be a WiFi connection, a Bluetooth connection, an NFC connection or other type of connection that may be established such that the wireless interface device to communicate with the subscription manager-discovery server (SM-DS) as described herein to download the reserved carrier eSIM profile from the carrier to be installed at the eSIM system on the information handling system. In an embodiment, this method 400 may be carried out where more than one carrier eSIM profile is to be downloaded from one or more wireless carriers. In an embodiment, this method 400 may be conducted for a plurality of information handling systems ordered by an IT specialist at a corporation or other organization with each information handling system being part of an enterprise carrier subscription. In an embodiment, the use of the OOB connection allows the information handling system to be operatively coupled to the SM-DS associated with the SM-DP+ of the carrier.

The method 400 may continue at block 445 with the information handling system leveraging the DDID or other device identification associated with the information handling system in a carrier verification request profile to initiate the carrier eSIM profile download. Again, this other device identification may include an IMEI that is compared to IMEI data associated with an information handling system's carrier verification request profile sent earlier by the manufacturer to the carrier as described herein at blocks 420, 425, and 430. In an embodiment, the DDID (or IMEI) may be encrypted by the manufacturer so that a secure comparison of the DDID (or IMEI) held by the carrier in the carrier verification request profile is maintained. This example DDID value may be sent to the SM-DS by the EC of the information handling system in a OOB communication along with a request for the carrier eSIM profile. As described herein, the OOB communication engine may establish an OOB communication with the SM-DS and, with WiFi network information such as a password and other certification data, allow the information handling system to communicate with the SM-DS and cause the downloaded carrier eSIM profile to be saved on the eSIM.

At block 450, the method 400 include deciding whether the profile is available at the SM-DS. The OOB connection from the information handling system to the GSMA SM-DS allows the GSMA SM-DS to receive the device identification (e.g., DDID) and match that device ID with carrier verification request profile and then associate the requesting information handling system with a carrier eSIM profile reserved for the device. In an embodiment where the profile is not available, the method may continue to block 470 with the EC initiating the BIOS and OS to initiate a boot-up process of the information handling system. The information handling system may then notify the user that the connection with the WWAN an carrier services could not be initiated and the process may end here.

Where the device ID does match a profile maintained in the GSMA SM-DS, the method 400 may continue at block 455 with the carrier SM-DP+ URL being sent to the information handling system over the OOB network. This URL, in an embodiment, may identify to the information handling system a location on a network where a carrier eSIM profile may be downloaded. In this embodiment, the SM-DP+ may be located within a secure website where the DDID of the information handling system is used in order to initiate the downloading of the carrier eSIM profile.

The method 400 may continue at block 460 with the carrier eSIM profile being downloaded over the OOB network to the eSIM of the information handling system. In an embodiment, this process may be assisted using the eSIM provisioning system described herein in connection with FIG. 1. The eSIM provisioning system may, according to the present description, perform tasks related to initiating an out-of-band (OOB) communication engine to establish an OOB communication with the subscription manager-discovery server (SM-DS), maintain WiFi network information such as a password and other certification data to allow the information handling system to communicate with the subscription manager-discovery server (SM-DS), and cause the downloaded carrier eSIM profile to be saved on the eSIM. In an embodiment, the eSIM provisioning system may also include an embedded universal integrated circuit card (eUICC). In this embodiment, the eUICC may, in an embodiment, maintain the eSIM profile with its eSIM credentials in order to operatively couple the information handling system to a wireless carrier such as a WWAN carrier network, among others.

Once the EC has downloaded the carrier eSIM profile to the eSIM chip or card, the user's information handling system, at block 465, the OS may be booted up and the boot up may be completed with the carrier eSIM profile installed. The carrier eSIM profile is used by the eUICC and the information handling system which may permit the OS to initiate connection the carrier's WWAM or another mobile broadband network using the eSIM. At this point the method 400 may end. It is understood that the number of carriers that the user of the information handling system may subscribe to may be more than one. In this embodiment, the process of determining whether other eSIM carrier profiles exist and downloading a carrier eSIM profile from a specific second URL (blocks 450, 455, 460) may be repeated for each individual carrier until all of the subscribed carriers' eSIM profiles are downloaded to the eUICC. This may allow a user who may travel internationally or from region to region to be able to connect to a mobile broadband service regardless of location. The system embodiment described may allow multiple WWAN options at one information handling system. Further, the system embodiment described may allow the information handling system to pick amongst the different mobile broadband services based on, for example, the least congested mobile broadband service, cheapest mobile broadband service, etc.

In an embodiment, the method 400 described in FIG. 4 may be repeated whenever the user accesses the manufacturer's e-commerce website and the user subscribes to any additional carriers' services. The method may be accomplished via the manufacturer send the IMEI or eID to the newly subscribed carrier (block 420). The new requested access for carrier eSIM profiles may be provided to the user's information handling system. Then the OOB system may be initiated to access the SM-DS of the new carrier. For example, the information handling system is turned off and turned back on again. When the information handling system or OOB is activated once again, the method may repeat itself at blocks 445, 450, 455, 460, and 465 in order to download the carrier eSIM profile to the eSIM and then the OS may initiate communications from the information handling system to a new carrier over a new mobile broadband network.

The blocks of the flow diagrams of FIG. 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of provisioning an embedded subscriber identification module (eSIM) profile on an information handling system, comprising:

with an embedded controller (EC), detecting a powering up process at the information handling system;

with execution of the EC, accessing pre-installed code instructions and a carrier information database with a manufacturer-assigned electronic identification of the information handling system and pre-subscribed carrier information for a pre-subscribed wireless wide area network (WWAN) wireless carrier for WWAN service upon ordering the information handling system from an information handling system manufacturer;

with the execution of the EC, establishing an out-of-band (OOB) connection with a subscription manager-discovery server (SM-DS) prior to startup of an operating system (OS) of the information handling system access the carrier information database and identify the pre-subscribed WWAN carrier and to communicate the manufacturer-assigned electronic identification to initiate download of a WWAN carrier eSIM profile pre-reserved at the SM-DS via a communication from the information handling system manufacturer for the information handling system to initiate an authentic subscription to services provided by the pre-subscribed WWAN carrier, the OOB connection being established at a level below the OS of the information handling system;

receiving the WWAN carrier eSIM profile over the OOB connection including an international mobile equipment identity (IMEI) from the pre-subscribed WWAN carrier;

installing the eSIM carrier profile with an embedded universal integrated circuit card (eUICC); and initiating, with a processor, a subscription confirmation with the pre-subscribed WWAN carrier to establish a WWAN wireless link.

2. The method of claim 1, wherein establishing the OOB connection includes connecting to a WiFi network using user-provided network security credentials.

3. The method of claim 1, wherein establishing the OOB connection includes connecting to the SM-DS via an intermediary companion device.

4. The method of claim 1, further comprising initiating a connection to a wireless network maintained by the pre-subscribed WWAN carrier upon downloading the WWAN carrier eSIM profile.

5. The method of claim 1, further comprising downloading the WWAN eSIM carrier profile download prior to boot up of a basic input/output system (BIOS).

6. The method of claim 1, further comprising causing, with the EC, a message to appear on a display device of the information handling system to notify a user that the OOB connection has been established to initiate a subscription confirmation with the pre-subscribed WWAN carrier.

7. The method of claim 1, further comprising initiating a subscription confirmation with a plurality of pre-subscribed WWAN carriers requested during a build to order configuration of the information handling system that have pre-subscribed carrier information stored in the carrier information database of the information handling system.

8. An information handling system operating an embedded subscriber identification module (eSIM) provisioning system comprising:

an embedded controller (EC), memory, and network interface device;

an eSIM provisioning system including an embedded universal integrated circuit card (eUICC) to receive an eSIM profile for accessing a wireless link with a pre-subscribed wireless wide area network (WWAN) carrier;

the EC accessing pre-installed code instructions and a carrier information database with a manufacturer-assigned electronic identification of the information handling system and pre-subscribed carrier information identifying a pre-subscribed wireless wide area network (WWAN) wireless carrier for WWAN service upon ordering the information handling system from an information handling system manufacturer;

a wireless interface device to, upon powering up of the information handling system and with the EC prior to start up of an operating system (OS), establish an out-of-band (OOB) connection with a subscription manager-discovery server (SM-DS) at the pre-subscribed WWAN carrier, transmit the manufacturer-assigned electronic identification, and initiate a download of a WWAN carrier eSIM profile pre-reserved at the SM-DS via a separate communication from the information handling system manufacturer for a subscription with the pre-subscribed WWAN carrier by comparison to a carrier verification request profile specific to the information handling system received from the information handling system manufacturer at pre-subscribed WWAN carrier with the manufacturer-assigned electronic identification; and the wireless interface device downloading the WWAN carrier eSIM profile including international mobile subscriber identity (IMSI) to the eUICC via the OOB connection and a processor continuing to boot up the OS of the information handling system and use the eUICC to establish a wireless link with the pre-subscribed WWAN carrier.

9. The information handling system of claim 8, wherein establishing the OOB connection includes connecting to a WiFi network using user-provided network security credentials.

10. The information handling system of claim 8, wherein establishing the OOB connection includes connecting to the SM-DS via an intermediary companion device.

11. The information handling system of claim 8, further comprising downloading, via the eSIM provisioning system and across the OOB connection, the WWAN carrier eSIM profile and initiating a connection to a wireless network maintained by the pre-subscribed WWAN carrier.

12. The information handling system of claim 8, further comprising preventing, with the EC, the boot up of a basic input/output system (BIOS) until the subscription confirmation with the pre-subscribed WWAN carrier is initiated.

13. The information handling system of claim 8, wherein the EC causes a message to appear on a display device of the information handling system to notify a user that the subscription confirmation has been completed.

14. The information handling system of claim 8, further comprising initiating subscription confirmation with a plurality of pre-subscribed WWAN carriers that have pre-subscribed carrier information stored in the database of the information handling system as requested when a build to order confirmation of the information handling system was conducted.

15. An information handling system operating an embedded subscriber identification module (eSIM) provisioning system comprising:

processor, memory, and network interface device;

an eSIM provisioning system including an embedded universal integrated circuit card (eUICC) prepared to receive an eSIM profile with the eSIM being left blank of the eSIM profile with eSIM credentials by a manufacturer of the information handling system;

an embedded controller (EC) accessing pre-installed code instructions and a carrier information database with a manufacturer-assigned unique device identification of the information handling system and pre-subscribed carrier information identifying a pre-subscribed wireless wide area network (WWAN) wireless carrier for WWAN service upon ordering the information handling system from an information handling system manufacturer;

a wireless interface device to establish an out-of-band (OOB) connection with a subscription manager-discovery server (SM-DS) of the pre-subscribed WWAN wireless carrier and download a wireless wide area network (WWAN) carrier eSIM profile with provisioned eSIM credentials pre-reserved at the SM-DS received via a communication from the information handling system manufacturer upon providing the manufacturer-assigned unique device identification (ID) for the information handling system assigned by the manufacturer and based on the information handling system manufacturer's build of the information handling system;

the processor, after the downloading of the WWAN carrier eSIM profile for the pre-subscribed WWAN wireless carrier, completing a boot-up process of a binary input/output system (BIOS) and an operating system (OS) and initiating communication with the pre-subscribed WWAN wireless carrier associated with the WWAN carrier eSIM profile via an LTE antenna system of the wireless interface device using the provisioned eSIM credentials.

16. The information handling system of claim 15, wherein establishing the OOB connection includes connecting to a WiFi network using user-provided network security credentials.

17. The information handling system of claim 15, wherein establishing the OOB connection includes connecting to an intermediary companion wireless device to further connect to the SM-DS.

18. The information handling system of claim 15, further comprising preventing, with the EC, the boot up of a basic input/output system (BIOS) until the download of the provisioned eSIM carrier profile occurs.

19. The information handling system of claim 15, wherein the EC causes a message to appear on a display device of the information handling system to notify a user that the subscription confirmation with the pre-subscribed WWAN wireless carrier has been completed.

20. The information handling system of claim 15, further comprising initiating a subscription confirmation with a plurality of pre-subscribed WWAN wireless carriers with which a user had requested access during a build to order configuration of the information handling system and that have pre-subscribed carrier information stored in the carrier information database of the information handling system.

* * * * *